United States Patent [19]

Iida

[11] Patent Number: 4,481,908
[45] Date of Patent: Nov. 13, 1984

[54] CLOSED-LOOP FUEL CONTROL SYSTEM FOR INTERNAL COMBUSTION ENGINE

[75] Inventor: Katsuyoshi Iida, Hiroshima, Japan

[73] Assignee: Mazda Motor Corporation, Hiroshima, Japan

[21] Appl. No.: 351,361

[22] Filed: Feb. 23, 1982

[30] Foreign Application Priority Data

Mar. 2, 1981 [JP] Japan .................. 56-30129

[51] Int. Cl.³ .............................................. F02B 43/00
[52] U.S. Cl. .................................. 123/1 A; 123/440; 123/489; 123/416
[58] Field of Search ............... 123/1 A, 415, 416, 417, 123/440, 489, 575, 589

[56] References Cited

U.S. PATENT DOCUMENTS

| 4,111,178 | 9/1978 | Casey | 123/416 |
| 4,201,161 | 5/1980 | Sasayama et al. | 123/489 |
| 4,231,331 | 11/1980 | Suzuki | 123/416 |
| 4,250,858 | 2/1981 | Jeenicke et al. | 123/416 |
| 4,391,253 | 7/1983 | Ito | 123/417 |

Primary Examiner—Parshotam S. Lall
Assistant Examiner—W. R. Wolfe
Attorney, Agent, or Firm—Wenderoth, Lind & Ponack

[57] ABSTRACT

A closed loop fuel control system for an automobile internal combustion engine, which derives a control signal indicative of the air-fuel mixing ratio and adapted to control the supply of a mixture of gasoline with alcohol to maintain the air-fuel mixing ratio at a stoichiometric value is used to control either the ignition timing or the rate of supply of exhaust gases being recirculated through the EGR system. This is applicable where as an automobile fuel, a mixture of air with blended fuel comprising, for example, gasoline and alcohol is used.

5 Claims, 3 Drawing Figures

CLOSED-LOOP FUEL CONTROL SYSTEM FOR INTERNAL COMBUSTION ENGINE

BACKGROUND OF THE INVENTION

The present invention generally relates to a fuel control system for an internal combustion engine and, more particularly, to a closed loop fuel control system for controlling the supply of a mixture of air with combined fuel to the engine in dependence on the composition of a particular component of exhaust geses emitted from the engine.

The term "combined fuel" hereinabove and hereinafter referred to for the purpose of the present invention is to be understood as meaning a mixture of two or more ignitable vaporizable fuels such as gasoline, kerosene, and aliphatic alcohol including, for example, ethanol and methanol.

With the rise of the oil price in recent years, attempts have been made in some countries in the world to use, for the combustion in an automobile internal combustion engine, of an alternative fuel, i.e., combined fuel, particularly consisting of gasoline mixed with alcohol, for example, ethanol or methanol, in a predetermined mixing ratio, for instance, in an amount within the range of 10 to 30% relative to the total weight of the combined fuel. The use of such a combined fuel, in contrast to a single fuel of gasoline now largely used, appears to increase in the near future and experiments are currently carried out to evaluate it.

In the course of the experiments, it has been found that gasoline and alcohol comprising the combined fuel tend to separate from each other while they are accommodated in a mixed state in a vehicle fuel tank. In addition, it appears that, when the time comes for the combined fuel to be available from local gas stations where gasoline and alcohol are mixed together, the mixing ratio of alcohol relative to gasoline would possibly vary from one gas station to another. In either case, the concentration of the alcohol in the combined fuel, and, hence, the ratio of air to combined fuel in an air-fuel mixture being supplied to the engine cannot be fixed for a given operating condition of the engine.

As is well known to those skilled in the art, the higher the concentration of the alcohol in the combined fuel, the lower the stoichiometric air-fuel mixing ratio. Therefore, where the concentration of the alcohol varies by the reason stated hereinabove, it is necessary to adjust from time to time the air-fuel mixing ratio (i.e., the ratio of air to combined fuel,) to the stoichiometric value in dependence on the change of the alcohol concentration so that the combustion of an air-fuel mixture, i.e., a mixture of air with combined fule, can take place efficiently in the engine.

This adjustment can automatically accomplished by the use of any known closed loop fuel control system wherein an electrical signal generated from a composition sensor for detecting the concentration of a particular component, for example, oxygen, contained in exhaust gases from the engine, which concentration is a function of the air-fuel mixture supplied to the engine, is fed back to a fuel supply system to control the supply of fuel to be subsequently mixed with air, thereby adjusting the air-fuel mixing ratio of an air-fuel mixture to be subsequently supplied to the engine to the stoichiometric value. An example of this known fuel control system is disclosed in the U.S. Pat. No. 4,186,691.

Although the accurate adjustment of the air-fuel mixing ratio of the mixture of air with combined fuel can successfully be accomplished by adopting the known fuel control system despite that the latter has obviously been developed for use with the mixture of air with gasoline, this does not mean that the combustion of the mixture of air with combined fuel as well takes place efficiently in the engine in terms of the engine power output. This is not only because alcohol has a property of low speed in combustion than gasoline and the combined fuel, i.e., the mixture of gasoline with alcohol is accordingly much slower to ignite and burn than the single gasoline, but also alcohol tends to evolve a larger amount of latent heat upon vaporization than gasoline does, More specifically, where the concentration of alcohol in the combined fuel or in the air-fuel mixture is relatively low, an engine knocking is apt to occur during a low speed high load operating condition of the engine and it is necessary, in order to avoid this tendency, to delay the ignition timing somewhat from the ignition timing at which the MBT (Minimum Advance for Best Torque) can be achieved with the combustion of the air-gasoline mixture. On the other hand, where the concentration of the alcohol is relatively high and if the ignition timing has been so set as hereinabove described for the purpose of avoiding the engine knocking, the ignition timing would be late for the combustion of the air-fuel mixture with the result of the reduced combustion efficiency because of the above described nature of the alcohol relative to the gasoline.

The above described problems may possibly be solved by providing a similar closed loop fuel control system, substantially in parallel with the previously discussed fuel control system, solely for controlling the ratio of mixture of gasoline with alcohol to a predetermined value by regulating the supply of alcohol or gasoline to be mixed with gasoline or alcohol, respectively, prior to the preparation of the combined fuel. However, this concept requires the use of not only the two, seemingly similar control systems but also separate fuel tanks and their associated fluid supply line, and is therefore neither economical nor payable for the cost-effectiveness.

SUMMARY OF THE INVENTION

Accordingly, the present invention has been developed with a view to substantially eliminating the above described disadvantages and inconveniences and has for its essential object to provide an improved closed loop fuel control system for an internal combustion engine of a type operable with the combined fuel, which is effective to control not only the fuel supply system but also either the spark advance system or the exhaust gas recirculating system for attaining the maximum combustion efficiency at all time during the operation of the engine regardless of particualr engine operating condition.

Another important object of the present invention is to provide an improved fuel control system of the type referred to above, which does not render the manufacturing cost of the engine system, particularly an automobile vehicle, to be unreasonably high and which is reliable in operation in spite of use of the combined fuel.

According to one preferred embodiment of the present invention, an improved closed loop fuel control system herein disclosed is featured in the provision of a compensating circuit connected between an air-fuel control circuit, which may be a known closed loop air-fuel control circuit such as disclosed in the previously mentioned U.S. patent, and an ignition timing control circuit so that an electrical control signal necessary to adjust the air-fuel mixture, i.e., the mixture of air with combined fuel, being supplied towards the engine to a stoichiometric value is modified to suit for use in the ignition timing control circuit.

In another preferred embodiment of the present invention, the compensating circuit is connected between the air-fuel control circuit and an actuator for controlling the flow of a portion of the exhaust gases to be recirculated from the exhaust system back to the fuel intake system.

BRIEF DESCRIPTION OF THE DRAWINGS

These and other objects and features of the present invention will become apparant from the following detailed description of the preferred embodiments of the present invention made with reference to the accompanying drawings, in which.

DETAILED DESCRIPTION OF THE EMBODIMENTS

Figure 1:
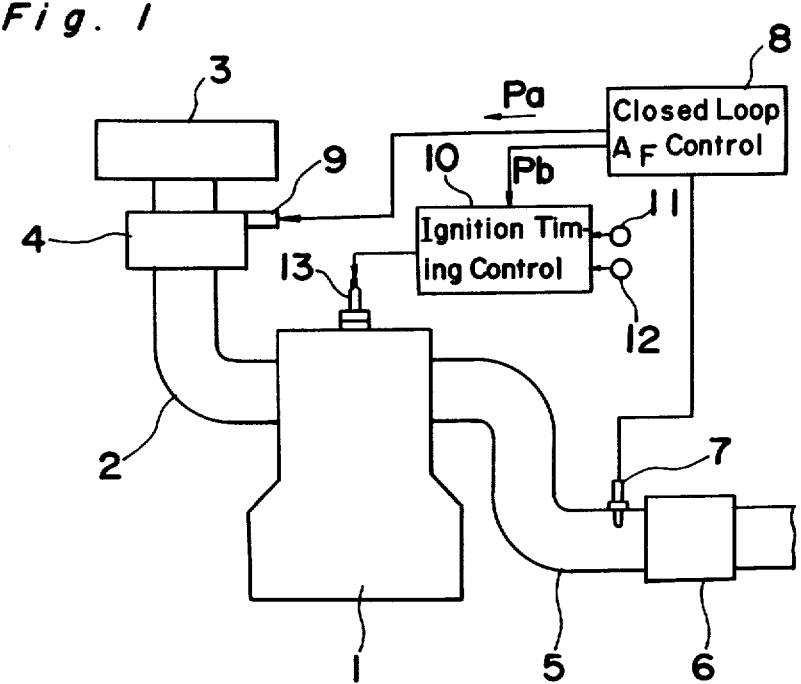
FIG. 1 is a schematic diagram showing an automobile internal combustion engine incorporating a closed loop fuel control system according to one embodiment of the present invention.

Before the description of the present invention proceeds, it is to be noted that like parts are designated by like reference numerals throughout the accompanying drawings.

Figure 2:
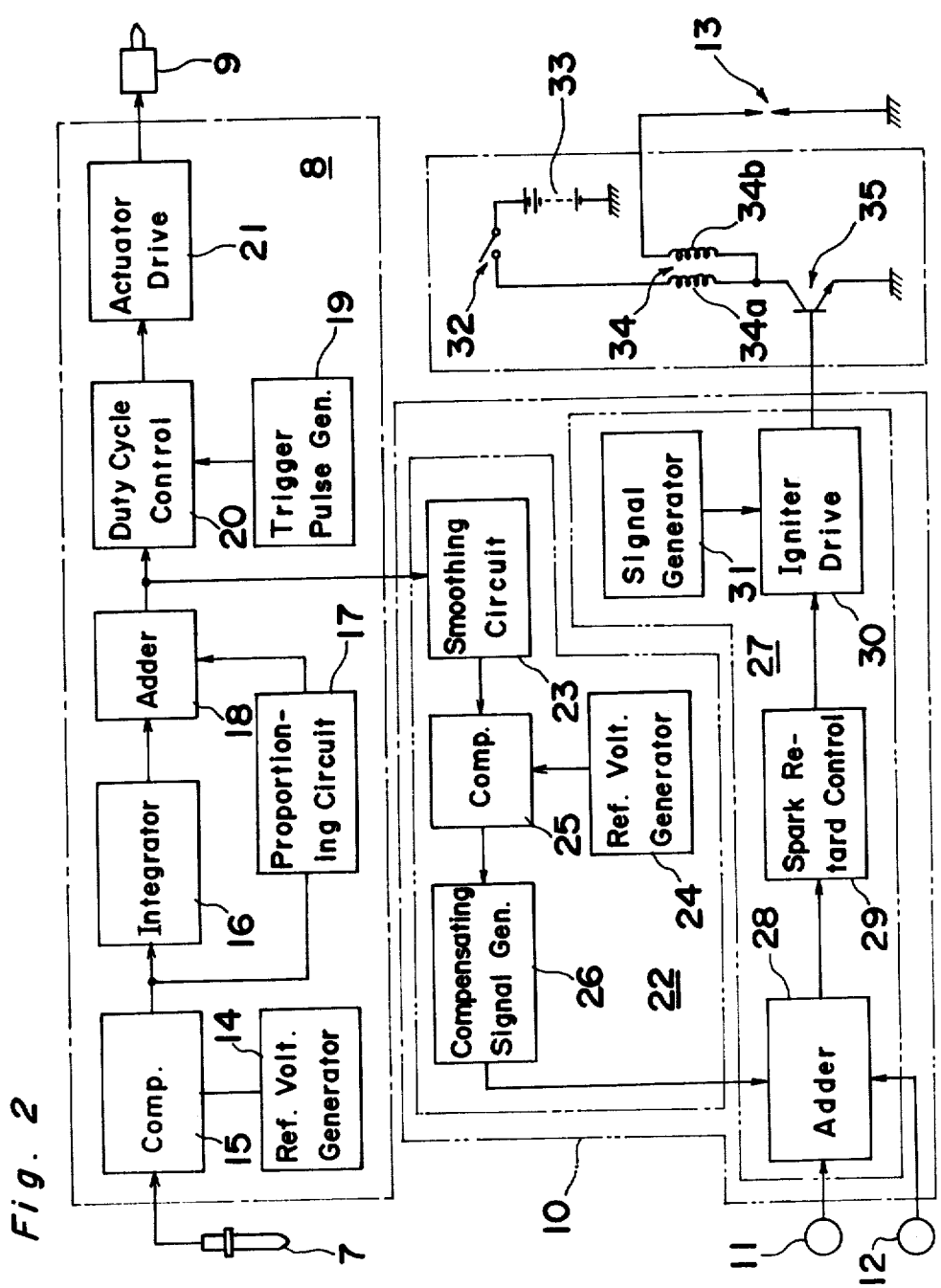
FIG. 2 is a block circuit diagram showing the control system shown in FIG. 1.

Referring first to FIGS. 1 and 2, an automobile internal combustion engine 1 has at least one combustion chamber communicated through a fuel intake port (not shown) to the atmosphere by means of a fuel intake passage 2 and also through an exhaust port (not shown) to the atmosphere by means of an exhaust passage 5. As shown, the fuel intake passage 2 has an air cleaner 3 and a carburetor 4 installed thereon whereas the exhaust passage 5 has an exhaust gas purifying unit 6, for example, either or both of an afterburner (thermal reactor) and a catalytic converter, installed thereon. The engine 1 also has an ignition plug 13 for cyclically igniting an air-fuel mixture, i.e., a mixture of air with combined fuel as defined hereinbefore, which has been supplied into the combustion chamber. The engine system so far described and its operation are well known to those skilled in the art and, therefore, the further details thereof will not be discussed herein for the sake of brevity.

It is, however, to be noted that the air-fuel mixture to be supplied to the combustion chamber can be prepared in a conventional manner by mixing the incoming air, which flows towards the combustion chamber through the air cleaner 3, with the combined fuel supplied from a single fuel tank (not shown) into the fuel intake passage 2 through the carburetor 4. Although the combined fuel herein defined is a mixture of two or more ignitable vaporizable fuels, the following description will be made as using the combined fuel comprising a mixture of gasoline with alcohol.

A closed loop air-fuel control unit, identified by 8, may be of any known construction and includes a composition sensor for detecting the concentration of a particular component, for example, oxygen, contained in exhaust gases flowing from the engine towards the exhaust gas purifying unit 6 through the exhaust passage 5, which concentration is a function of the ratio of air to combined fuel of the air-fuel mixture burned in the combustion chamber. The control unit 8 is so designed as to generate two control outputs of different characters in response to the composition signal from the composition sensor 7 which is indicative of the concentration of the exhaust gas component. One of these control outputs from the control unit 8, identified by Pa, is supplied to an actuator 9 used, for example, to regulate the flow of a bleeding air to be mixed with the combined fuel in the carburetor 4 prior to such combined fuel being mixed with the incoming air in the intake passage 2 to form the air-fuel mixture. The other of the control outputs, identified by Pb, is adapted to be supplied to an ignition timing control unit 10 which also receives an pressure signal from a pressure sensor 11 for detecting the magnitude of negative pressure developed inside the intake passage 2 and an engine speed signal from a speed sensor 12 for detecting the engine speed.

As best shown in FIG. 2, the control unit 8 comprises, as is well known to those skilled in the art, a comparator 15 for comparing the level of the composition signal from the composition sensor 7 with the level of a reference voltage, supplied thereto from a reference voltage generator 14, to find whether the air-fuel mixture which had been burned in and subsequently exhausted from the engine 1, which air-fuel mixture is hereinafter referred to as a post-combustion gas, is enriched or leaned, which comparator 15 is capable of generating one at a time high level and low level output signals when the post combustion gas has been found enriched and leaned, respectively, as a result of the comparison; an integrator 16 capable of generating an integrated output which is the integral of the difference signal from the comparator 15 with respect to time, which integrated output includes a positive-going signal of increasing voltage which is generated therefrom in response to the receipt of the high-level signal and a negative-going signal which is generated therefrom in response to the receipt of the low-level signal; a proportioning circuit 17 for detecting the change in state of the difference output from the comparator 15, i.e., between the high and low level signals and for generating a proportional signal proportional to the difference signal from the comparator 15, which proportional signal has a voltage increasing in proportion to the voltage of the high level signal or decreasing in proportion to the voltage of the low level signal; an adder circuit 18 for summing up the integrating signal and the proportional signal; a duty cycle control 20 adapted to receive both the output from the adder 18 and a train of pulses supplied from a trigger pulse generator 19 and operable to determine the duty cycle of the trigger pulses in accordance with the output from the adder 18; and an actuator drive circuit 21 operable in response to the trigger pulses of controlled duty cycle from the duty cycle control 20 to generate the control signal Pa. This control signal Pa is in the form of pulses, the duty cycle of which is proportional to or identical with the duty cycle determined by the duty cycle control 20 and is used to drive the actuator 9 which is generally in the form of an electromagnetic valve, specifically an electromagnetically operated needle valve for selectively closing and opening the air bleed port in the carburetor 4 to regulate the flow of the bleed air as hereinbefore described. Briefly speaking, the air-fuel control unit 8 of the above described construction is so designed as to generate in response to the composition signal from the sensor 7 the control signal Pa capable of assuming two states one at a time according to whether the post-combustion gas has been enriched or leaned so that the supply of the bleed air can be selectively initiated and terminated, when the post combustion gas has been found leaned or enriched, respectively, to attain a stoichimetric mixing ratio of the mixture of air with combined fuel which is to be subsequently supplied to the engine.

Referring still to FIG. 2, the ignition timing control unit 10 incorporates therein a compensating circuit 22 operable in response to the output from the adder circuit 18 to generate a compensating signal necessary to advance the ignition timing only when the output applied from the adder circuit 18 when the post-combustion gas has been detected enriched, that is, when the concentration of alcohol in the air-fuel mixture which had been supplied to the engine has been found high, exceeds a predetermined value.

This compensating circuit 10 comprises a smoothing circuit 23 for smoothing the output fed from the adder circuit 18, a comparator 25 for comparing the level of the smoothed output from the circuit 23 with the level of a reference voltage fed from a reference voltage generator 24 and for generating a difference signal therebetween, and a compensating signal generator 26 for generating the compensating signal in response to the difference signal only when the level of the smoothed output from the circuit 23 has been found higher than the level of the reference voltage from the generator 24. The reference voltage from the generator 24 may correspond to the voltage of the output from the adder circuit 18 which in turn correspond to the stoichiometric air-fuel mixing ratio to be attained when the concentration of alcohol is 30% by volume, which stoichiometric would be 13.2 or 12.4 where the alcohol is ethanol or methanol, respectively. By so selecting the reference voltage from the generator 24, it is possible to cause the compensating signal generator 24 to generate the compensating signal only when the concentration of alcohol in the air-fuel mixture become higher than a predetermined value.

The ignition timing control unit 10 also comprises an ignition timing control circuit 27 including an adder 28 adapted to receive the compensating signal from the compensating circuit 22, a pressure signal from a pressure sensor 11 for detecting the magnitude of negative pressure inside the intake passage 2 and a speed signal from a speed sensor 12 for detecting the engine speed, spark retard control 29, and an igniter drive circuit 30 adapted to receive an output from the control 29 and also a train of pulses generated from a signal generator 15 in synchronism with the revolution of the engine 1 and operable to supply a high voltage surge current to an igniter circuit as will be described later.

The compensating signal from the compensating circuit 22 is first applied to the adder 28. When and so long as this compensating signal is not generated from the generator 26, the adder 28 operates in response to the pressure and speed signals from the respective sensors 11 and 12 to generate an output signal indicative of the angle by which the spark advance is to be retarded for the particular engine operating condition. The spark retard control 29 controls the igniter drive circuit 30 in response to the output signal from the adder 28 so that the output timing of the reference pulses from the signal generator 31 can be controlled. The output from the igniter drive circuit 30 is applied to the base of a switching transistor 35.

The igniter circuit also includes an ignition coil assembly 34 having a primary winding 34a, connected at one end to ground through the collector-emitter path of the transistor 35 and at the other end to a source of D.C current 33 through a known ignition switch 32, and a secondary winding 34b connected at one end to ground through the collector-emitter path of the transistor 35 and at the other end to a known spark plug 13. As is well known to those skilled in the art. This ignition circuit is operable in such a manner that, assuming that the ignition switch 23 is closed, the spark plug 13 can be fired by the high voltage generated across the secondary winding 34b in response to the switching-off of the transsistor 35 which takes place in response to the stepdown of the output pulse applied from the drive circuit 30 to the base of the transistor 35.

On the other hand, when and so long as the compensating signal is generated from the generator 26 and is, therefore, applied to the adder 28, the adder 28 is operable to reduce the angle by which the spark advance is to be retarded to a value somewhat smaller than that calculated when the compensating signal is not applied thereto from the generator 26, in dependence on the increase of the alcohol concentration, so that the ignition timing of the spark plug 13 can be correspondingly advanced an angle greater than that achieved during the absence of the compensating signal.

In view of the above, when the alcohol concentration is higher than 30%, the ignition timing can be advanced a predetermined angle greater than that achieved when the alcohol concentration is equal to or lower than 30%, whereby any possible reduction in velocity of combustion which would occur when the alcohol concentration is higher than the predetermined value can advantageously be compensated for and, accordingly, the combustion of the air-fuel mixture in the engine takes place favorably substantially irrespective of the change in alcohol concentration.

In the foregoing embodiment, it has been described that the compensating circuit 22 is incorporated in the ignition timing control unit 10. However, it may alternatively be incorporated in a known exhaust gas recirculating (EGR) system 40 which will now be described with particular reference to FIG. 3.

Figure 3:
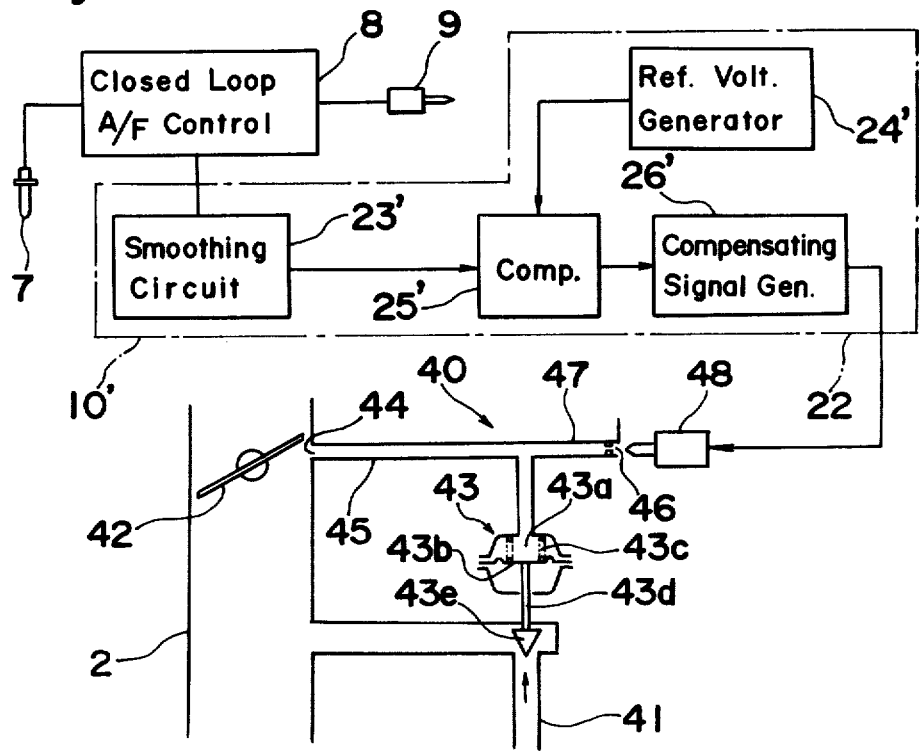
FIG. 3 is a schematic diagram showing the control system according to another embodiment of the present invention.

Referring now to FIG. 3, the EGR system 40 may be of any known construction and, so far shown, includes a diaphragm control valve assembly 43 for regulating the flow of exhaust gases, flowing through a recirculating passage 41 fluid-connecting the exhaust passage 5 back to a portion of the intake passage 2 downstream of a throttle valve 42, depending on the magnitude of a negative pressure introduced into a working chamber 43a of the valve assembly. For this purpose, the valve assembly 43 includes a valve member 43e normally held in position to close the recirculating passage 41 by the action of a biasing spring 43c which is housed in the working chamber 43a and displaces a diaphragm member 43b with the biasing force of the spring 43c being transmitted to the valve member 43e through a connecting rod 43d. The working chamber 43a of the valve assembly is fluid-connected through a pressure line 45 to an opening 44 which is in communication with the intake passage 2 at a position adjacent to, but downstream of the throttle valve 42 with respect to the direction of flow of the air-fuel mixture towards the engine 1. The pressure line 45 is also communicated to the atmosphere by way of a branch line 47 through an orifice 46 which is adapted to be selectively opened and closed by an electromagnetic actuator 48, for example, an electromagnetic needle valve, in a manner as will subsequently be described.

The compensating circuit 10' shown in FIG. 3 comprises a smoothing circuit 23', a reference voltage generator 24', a comparator 25' and a compensating signal generator 26' which correspond to and are operable in similar manners to that circuits 23, 24, 25 and 26 shown in FIG. 2. More specifically, the circuit 10' is so designed that the compensating signal can be generated from the generator 26', only when the alcohol concentration has been detected higher than the predetermined value, i.e., 30% in this instance, to cause the actuator 48 to open the orifice 47 thereby to reduce or interrupt the flow of the exhaust gases being recirculated. This is possible because, when the orifice 47 is so opened the negative pressure inside the pressure line 45 escapes to the atmosphere through the branch line 47, so far from entering the working chamber 43a.

On the other hand, when and so longer the compensating signal is not applied to the actuator 48, the valve assembly 43 operates in a manner substantially reverse to that described above, whereby the recirculation of the exhaust gases from the exhaust passage 5 into the intake passage 2 is permitted in dependence on the magnitude of the negative pressure introduced into the working chamber 43a.

With the EGR system incorporating the compensating circuit 10', not only can any possible reduction in combustibility of the air-fuel mixture in the engine as a result of the high latent heat evolved by the alcohol be compensated for, but also the emission of $NO_x$ component which is relatively large in view of the fact that the velocity of combustion of the alcohol is lower than that of gasoline can advantageously effectively suppressed.

From the foregoing, it has now become clear that the present invention is featured in that an air-fuel ratio control signal generated in dependence on the composition of the particular component of the exhaust gases and utilizeable to maintain the air-fuel mixing ratio at a stoichiometric value is used as an electrical signal indicative of the alcohol concentration, said electrical signal being supplied to any means, which governs the combustibility of the air-fuel mixture, only when the alcohol concentration exceeds the predetermined value, whereby any possible reduction in combustibility resulting from the increased alcohol concentration can be compensated for. In view of the above, according to the present invention, no sensor for detecting the alcohol concentration and its associated circuitry is required. Therefore, with the teachings of the present invention, the use of alcohol as an automobile fuel can be expected to expand before long.

Although the present invention has fully been described in connection with the preferred embodiments with reference to the accompanying drawings, it is to be noted that various changes and modifications are apparent to those skilled in the art. By way of example, although the output from the compensating circuit has been described as used to control either the ignition timing or the EGR system, it may also be used to control fuel enricher in such a way as to increase the supply of combined fuel only during a high load operating condition of the engine or an intake fuel heating device in such a way as to heat the incoming air flowing through the intake passage upstream of the carburetor. In any event, the compensating signal may be used to control any means which governs the combustibility of the air-fuel mixture in the engine.

Such changes and modifications are, therefore, to be understood as included within the true scope of the present invention unless they depart therefrom.

I claim:

1. A closed loop fuel control system for an internal combustion engine wherein a combustible mixture of air with combined fuel is burned in at least one combustion chamber, said combined fuel comprising a plurality of ignitable vaporizable fuels each having a different stoichiometric air-fuel mixing ratio, said system comprising:

a fuel supply means for supplying said combustible mixture into said at least one combustion chamber;

an exhaust sensor for detecting a concentration of a component of exhaust gases emitted from said engine;

a determining means operable in response to an output from said exhaust sensor for determining whether an air-fuel mixing ratio of said combustible mixture which is to be supplied to said at least one combustion chamber is higher than a predetermined value or lower than said predetermined value and for providing an output in response to said determination;

a fuel control means operable in response to said output from said determining means for generating an output signal which is input to said fuel supply means so as to control said air-fuel mixing ratio to be equal to said predetermined value;

a detecting means for detecting a change in composition of said combustible mixture in dependence on a change in said output signal from said fuel control means and for providing an output in response to said detection;

wherein said engine has an operating parameter having a required control value which is variable according to a change in composition of said ignitable vaporizable fuel, said operating parameter being other than said air-fuel mixing ratio;

said system further comprising a basis control means for controlling said operating parameter in dependence on an operating condition of said engine; and a compensating means operatively connected to said detecting means for correcting said operating parameter in dependence on said output from said detecting means.

2. A system as claimed in claim 1, wherein said plurality of ignitable vaporizable fuels comprise alcohol and gasoline.

3. A system as claimed in claim 2, wherein said detecting means comprises a sensor for detecting a concentration of oxygen contained in said exhaust gases emitted from said engine.

4. A system as claimed in claim 2 or 3, wherein said engine operating parameter comprises an ignition timing at which a spark plug of said engine is to be fired, said ignition timing being advanced when said output from said determining means indicates that said air-fuel mixture is enriched.

5. A system as claimed in claim 2 or 3, wherein said parameter is the rate of supply of exhaust gases to be recirculated, said rate being decreased when the compensating signal exceeds a predetermined value showing that the air-fuel mixture has been enriched.

* * * * *